US008848582B2

(12) United States Patent
Xiao

(10) Patent No.: US 8,848,582 B2
(45) Date of Patent: Sep. 30, 2014

(54) METHOD FOR MEASURING THROUGHPUT AND MAINTENANCE END POINT

(75) Inventor: Min Xiao, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 116 days.

(21) Appl. No.: 13/636,687

(22) PCT Filed: Oct. 8, 2010

(86) PCT No.: PCT/CN2010/077596
§ 371 (c)(1),
(2), (4) Date: Oct. 18, 2012

(87) PCT Pub. No.: WO2011/116599
PCT Pub. Date: Sep. 29, 2011

(65) Prior Publication Data
US 2013/0136030 A1 May 30, 2013

(30) Foreign Application Priority Data

Mar. 24, 2010 (CN) .......................... 2010 1 0140105

(51) Int. Cl.
H04B 1/44 (2006.01)
H04L 12/26 (2006.01)
H04L 12/28 (2006.01)

(52) U.S. Cl.
CPC ............. *H04L 43/0888* (2013.01); *H04L 43/12* (2013.01); *H04L 43/10* (2013.01); *H04L 43/0811* (2013.01)
USPC .......................................... 370/282; 370/401

(58) Field of Classification Search
None
See application file for complete search history.

(56) References Cited

U.S. PATENT DOCUMENTS

2007/0070909 A1* 3/2007 Reeve ........................... 370/238
2009/0046574 A1* 2/2009 Luo et al. ...................... 370/216
2011/0182185 A1* 7/2011 Vigoureux et al. ......... 370/241.1

FOREIGN PATENT DOCUMENTS

| CN | 1794670 A | 6/2006 |
|---|---|---|
| CN | 1860734 A | 11/2006 |
| CN | 1881908 A | 12/2006 |
| EP | 1855416 A1 | 11/2007 |

OTHER PUBLICATIONS

EPO, Extended European Search Report for Application No. 10848261.3 dated Feb. 7, 2014.

(Continued)

*Primary Examiner* — Eunsook Choi
(74) *Attorney, Agent, or Firm* — Bright IP Law Offices

(57) ABSTRACT

The disclosure claims a method for measuring throughput and a Maintenance End Point (MEP). The method is applied in the Multi-Protocol Label Switching-Transport Profile (MPLS-TP) network. The method comprises the following steps: a first MEP in the MPLS-TP network performs the transmission of the data packets with a second MEP in the MPLS-TP network in a preset time period; after the preset time period, the first MEP receives measurement information fed back by the second MEP, wherein the measurement information indicates the number of data packets transmitted by the second MEP in this transmission; according to the measurement information, the first MEP judges that packet loss does not occur in this transmission of the data packets and the transmission rate meets the requirement of target precision, and then obtains the throughput of the transmission of the data packets in the transmission direction. According to the technical solutions provided by the disclosure, measurement cost can be saved and operation and maintenance can be simplified.

15 Claims, 6 Drawing Sheets

(56) References Cited

OTHER PUBLICATIONS

Feng Huang (Editor) et al. "Diagnostic tool-test for MPLS transport profile; draft-flh-mpls-tp-oam-diagnostic-test-00.txt", Diagnostic Tool—Test for MPLS Transport Profile; draft-flh-mpls-tp-oam-diagnostic-test-00.txt, Internet Engineering Task Force, IETF; Standardworkingdraft, Internet Society (ISOC) 4, Rue Des Falaises CH—1205 Geneva, Switzerland, Oct. 21, 2009, XP015065275, [retrieved on Oct. 28, 2009].

Sprecher N et al: "MPLS-TP OAM Analysis; draft-ietf-mpls-tp-oarn-analysis-01.txt", MPLS-TP OAM Analysis; draft-ietf-mpls-tp-oam-analysis-01.txt, Internet Engineering Task Force, IETF; Standardworkingdraft, Internet Society (ISOC) 4, Rue Des Falaises CH—1205 Geneva, Switzerland, No. 1, Mar. 4, 2010, pp. 1-36, XP015067670, [retrieved on Mar. 4, 2010].

P.R. China, State Intellectual Property Office, International Search Report for International Application No. PCT/CN2010/077596, mailed Jan. 6, 2011.

M. Xiao et al., Throughput Estimation for MPLS Transport Profile, Draft-xiao-mpls-tp-throughput-estimation-00, MPLS Working Group, Apr. 12, 2010, sections 4-5.

* cited by examiner

METHOD FOR MEASURING THROUGHPUT AND MAINTENANCE END POINT

CROSS REFERENCE TO RELATED APPLICATIONS

This application is the U.S. National Stage of International Patent Application No. PCT/CN2010/077596 filed on Oct. 8, 2010, which claims priority to Chinese Patent Application No, 201010140105.9 filed on Mar. 24, 2010. Both the PCT Application and Chinese Application are hereby incorporated by reference in their entirety.

FIELD OF THE INVENTION

The disclosure relates to the field of data communication, and in particular to a method for measuring throughput and a Maintenance End Point (MEP).

BACKGROUND OF THE INVENTION

In the current various data communication networks, the throughput, as an important network performance metric, has become one of test items that the network operators are most concerned. The Internet Engineering Task Force (IETF) which is an organization for standards gave an initial definition of throughput in the standard RFC1242 published in July 1991. That is, the throughput is the maximum forwarding rate that a device can support under the condition of no packet loss. From the initial standardized definition of throughput, the throughput of that time was a concept mainly aiming at single specific network device. But, with extension of the definition of throughput, the throughput involved in the current communication industry can not only aim at single network device, but also at a specific communication link comprising multiple network devices in the communication network. Then the definition of throughput is extended to be the maximum transmission rate that this communication link can support under the condition of no packet loss.

With the rapid development of data network communication in the 1990s, the IETF provided, in the standard RFC1944 published in May 1996, a whole set of basic testing methods of network device, comprising a method for measuring throughput. Thereafter, in May 1999, the IETF obsoleted the standard RFC1944 with a newly published RFC2544 standard. The RFC2544 standard is still in use today. In the RFC2544 standard, the method for measuring throughput is described as that: a measuring instrument is used to send a certain number of test packets to a device under test at a certain transmission rate; if the number of test packets actually forwarded by the device under test is less than that transmitted by measuring instrument, then the measuring instrument sends again at a reduced transmission rate; and this process is repeated, until the maximum transmission rate without packet loss is found; and the maximum transmission rate is the throughput of the device under test.

Based on the basic method for measuring throughput provided in the RFC2544 standard, in practice, the industry usually adopts a binary search algorithm to measure the throughput of the communication device under test or communication link under test. The search principle of the binary search algorithm is described as follows: suppose that the throughput of the communication device under test or communication link under test is A, a manually configured target precision is C, and a manually configured initial rate for sending test traffic is B (it is required that B>A, otherwise the throughput cannot be measured by adopting the binary search algorithm); B is used as the rate to send test traffic in the first measurement iteration, and packet loss occurs, so that B/2 is used as the rate to send test traffic in the second measurement iteration; if packet loss does not occur in the second measurement iteration, it is judged whether the rate used by this measurement iteration meets the requirement of target precision, the judging method is as follows: if the quotient obtained by dividing the difference between the rate used by this measurement iteration and the rate used by the last measurement iteration by the rate used by this measurement iteration (in the example, the quotient is (B−B/2)/(B/2)=1) is no greater than the target precision C, then it is deemed that the rate used in this measurement iteration meets the requirement of target precision; if the quotient is greater than the target precision C, then it is deemed that the rate used by this measurement iteration does not meet the requirement of target precision. If the judgment result is that the rate of the second measurement iteration meets the requirement of target precision, then the measurement of throughput ends, and the rate is the obtained throughput; if the judgment result is that the rate of the second measurement iteration does not meet the requirement of target precision, then the measurement of throughput proceeds, and the third measurement iteration uses (B+B/2)/2 as the rate to send test traffic; if packet loss occurs in the second measurement iteration, then it won't be judged whether the rate used by this measurement iteration meets the requirement of target precision, and the third measurement iteration uses (0+B/2)/2 as the rate to send test traffic; and the process is repeated, until the throughput which meets the requirement of target precision is finally obtained after multiple measurement iterations.

FIG. 1 shows a schematic diagram of using measuring instrument to measure the throughput of a communication link. As shown in FIG. 1, measuring instruments 1 and 2 are connected to the Provider Edges (PE) at two ends of the link under test respectively. The instruments 1 and 2 are cascaded through a special communication link (usually a low-speed link), so that the single control software of the measuring instrument can perform centralized control. There may be one or more Provider Devices (P) between two PEs. Before measuring the throughput, it is required to first configure measurement parameters and target precision, wherein the measurement parameters comprise: initial transmission rate of test traffic, transmission duration, size of test packet, priority of test packet and pattern of test packet. The initial transmission rate is usually configured as the maximum physical bandwidth of the link under test; the transmission duration means the duration for sending test traffic at each measurement iteration; the size and priority of test packet will influence the measurement result of the throughput. Generally speaking, the measurement of throughput is required to cover various typical sizes of test packets and all priorities. Usually, the pattern of test packet can be configured to be pseudo-random code, so as to better simulate real service traffic.

After starting the measurement of throughput, the control software of measuring instrument controls sending of test traffic according to the configured measurement parameters, and monitors reception of test traffic. After the completion of each measurement iteration, the control software of measuring instrument calculates the packet loss rate and calculates the transmission rate that will be used by the next measurement iteration according to the binary search algorithm. After that, the next measurement iteration is started until the throughput which meets the requirement of the specified target precision is found.

At present, a technology called Multi-Protocol Label Switching-Transport Profile (MPLS-TP), which is being researched by the two standards organizations IETF and International Telecommunication Union (ITU) cooperatively, is expected to enhance the Operation, Administration and Maintenance (OAM) capability of the traditional Multi-Protocol Label Switching (MPLS) technology. The technology defines a series of OAM functional entities, and makes a series of OAM function requirements based on these functional entities. One of the OAM functions is called the diagnostic test function, and the measurement of throughput is the most important one of the diagnostic test function requirements. At present, no technical solution meeting the function requirement has been disclosed.

FIG. 2 shows a schematic diagram of OAM functional entities in the MPLS-TP network. As shown in FIG. 2, one or more MEPs can be created based on port on the PE at the edge of the MPLS-TP network, and one or more Maintenance Intermediate Points (MIP) can be created based on port on the P in middle of the MPLS-TP network. It is clearly required in the OAM function requirements of the MPLS-TP that the measurement of throughput can be performed between MEP and MEP, and the MEPs at two ends can be at a Pseudowire (PW) layer, a Label Switched Path (LSP) layer or a section layer.

The reason that the standards organizations make throughput measuring function requirements based on MEP for the MPLS-TP network is that if measuring instrument is used to measure the throughput of the communication link, it requires measuring instruments and operators allocated at two ends of the link at the same time, and requires cascade of measuring instruments through special communication link, which causes very high measurement costs. In practical measurement, it also needs personals to manually connect transmitting/receiving port of the measuring instrument to port of the communication link under test. This is laborious and time-consuming, error connection may be caused, and the operation and maintenance is complex.

SUMMARY OF THE INVENTION

Aiming at the problems in relevant technologies that measurement cost is very high, and operation and maintenance is complex because of using measuring instrument to measure the throughput of communication link, the disclosure mainly provides a method for measuring throughput and a MEP, for solving at least one of above problems.

According to one aspect of the disclosure, a method for measuring throughput is provided.

The method for measuring throughput according to the disclosure which is applied in the MPLS-TP network comprises: a first Maintenance End Point (MEP) in the MPLS-TP network performing transmission of data packets with a second MEP in the MPLS-TP network in a preset time period; after the preset time period, the first MEP receiving measurement information fed back by the second MEP, wherein the measurement information indicates the number of the data packets transmitted by the second MEP in this transmission; and according to the measurement information, the first MEP determining that packet loss does not occur in this transmission of the data packets and a transmission rate meets a requirement of target precision, and then obtaining the throughput of the transmission of the data packets in a transmission direction.

According to another aspect of the disclosure, a MEP is provided.

The MEP according to the disclosure comprises; a transmission device, configured to perform transmission of data packets with another MEP in the MPLS-TP network in a preset time period; a first receiving device, configured to, after the preset time period, receive measurement information fed back by the another MEP, wherein the measurement information indicates the number of the data packets transmitted by the another MEP in this transmission; a judgment device, configured to judge whether packet loss occurs in this transmission of the data packets according to the measurement information, and if not, judge whether a transmission rate meets a requirement of target precision; and a determination device, configured to obtain a throughput of the transmission of the data packets in a transmission direction based on that the judgment device judges that packet loss does not occur in this transmission of the data packets and the transmission rate meets the requirement of target precision.

Through the disclosure, after the measurement of throughput is started, a local MEP in the MPLS-TP network performs the transmission of the data packets with the opposite MEP in the MPLS-TP network in a preset time period. After a measurement iteration is ended, the opposite MEP will send information of the transmitted data packets (namely the measurement information) in the measurement iteration to the local MEP through a count message, for calculating packet loss in the measurement iteration. When packet loss is 0 and the transmission rate meets the requirement of target precision, the throughput of transmission the data packets in the transmission direction can be determined at the local MEP. This solution solves the problems in relevant technologies that measurement cost is very high, and operation and maintenance is complex because of using measuring instrument to measure the throughput of the communication link. Thereby, measurement cost can be saved, and operation and maintenance can be simplified.

BRIEF DESCRIPTION OF THE DRAWINGS

The drawings described herein are used for providing a further understanding of the disclosure, and constitute a part of the application. The schematic embodiments of the disclosure and description thereof are used for illustrating the disclosure and are not intended to form improper limit to the disclosure. In the drawings.

DETAILED DESCRIPTION OF THE EMBODIMENTS

The disclosure is described in detail hereinafter with reference to the drawings and the embodiments. It should be noted that the embodiments and the features in the embodiments of the application can be combined with each other if there is no conflict.

In the MPLS-TP network, one or more MEPs created based on port can perform, as a local MEP (hereinafter called the first MEP), the transmission of the data packets with an opposite MEP (hereinafter called the second MEP) of the local MEP and can determine the throughput of the transmission of the data packets in the transmission direction through the measurement information of transmitted data packets fed back by the second MEP.

Figure 1:
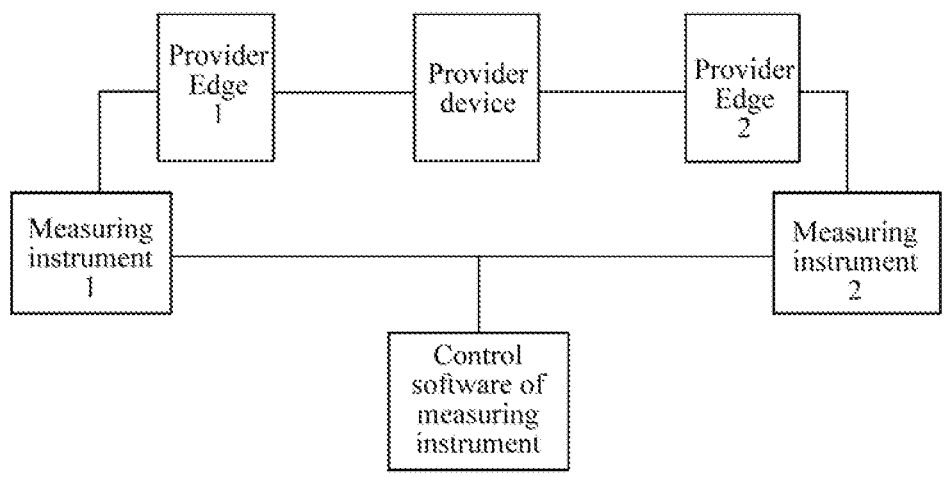
FIG. 1 shows a schematic diagram of using measuring instrument to measure the throughput of communication link in relevant technologies.
Figure 2:
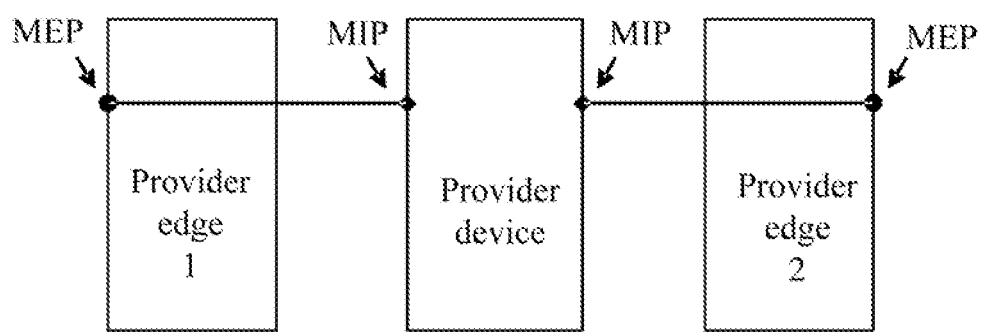
FIG. 2 shows a schematic diagram of OAM functional entities in the MPLS-TP network.
Figure 3:
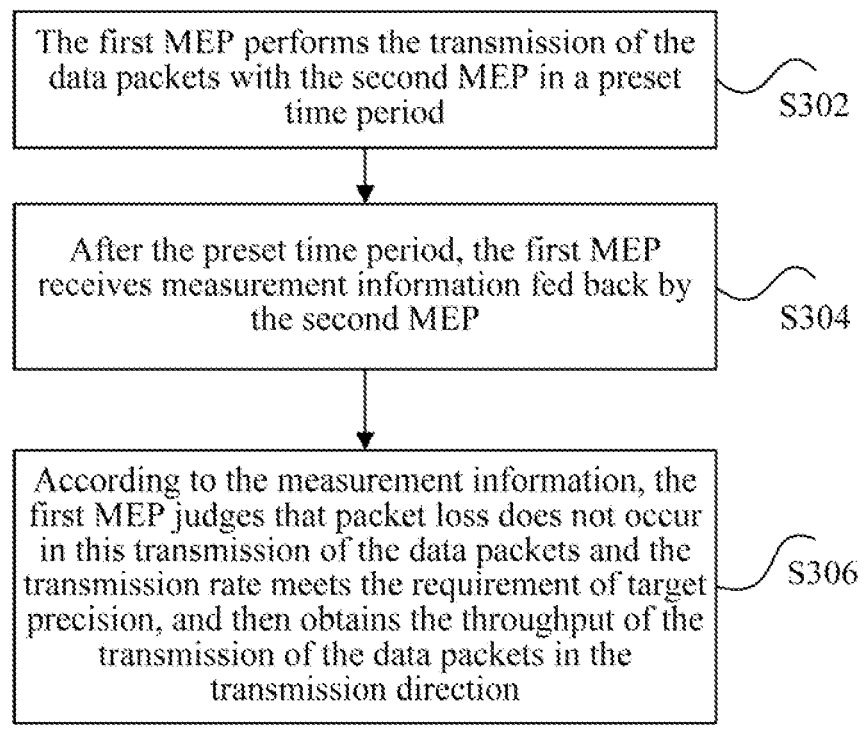
FIG. 3 shows a flowchart of a method for measuring throughput according to the embodiment of the disclosure.

FIG. 3 shows a flowchart of a method for measuring throughput according to the embodiment of the disclosure. The method for measuring throughput comprises the following steps.

Step S302: the first MEP in the MPLS-TP network performs the transmission of the data packets with the second MEP in the MPLS-TP network in a preset time period.

Step S304: after the preset time period, the first MEP receives the measurement information fed back by the second MEP, wherein the measurement information indicates the number of the data packets transmitted by the second MEP in this transmission.

Step S306: according to the measurement information, the first MEP judges that packet loss does not occur in this transmission of the data packets and the transmission rate meets the requirement of target precision, and then obtains the throughput of the transmission of the data packets in the transmission direction.

In relevant technologies, using measuring instrument to measure the throughput of communication link requires measuring instruments and personals allocated at two ends of the link at the same time, and requires cascade of the measuring instruments through special communication link. Therefore, it is laborious and time-consuming, and the measurement cost is very high. By adopting the above method, measuring instrument is not need, and the measurement of two-way throughput (two respective throughputs each with one transmission direction) or one-way throughput (one throughput with one transmission direction) can be started and completed just at one end of the measured link. The method saves manpower, material resources and time, so that cost can be reduced and operation and maintenance can be simplified.

Preferably, before executing step S302, the method can also comprise the following processing: locking the first MEP and the second MEP.

In the specific implementation process, locking the first MEP and the second MEP can comprise the following processing: the first MEP starts a diagnostic test function of throughput measuring mode and locks the first MEP; and the first MEP sends a command to the second MEP to lock the second MEP.

Through the above locking processing, before the test, the service traffic in both transmission directions of a certain MEP transmits to the other MEP can be prevented. Thereby, test accuracy can be improved effectively.

Preferably, the first MEP performs the transmission of the data packets with the second MEP in the following mode: two-way transmission mode. Performing the transmission of the data packets in the two-way transmission mode is to perform the measurement of two-way throughput. The process of measurement of two-way throughput is described below.

Preferably, before executing step S302, for the measurement of two-way throughput, the first MEP sends a measurement iteration start indication message to the second MEP, wherein the measurement iteration start indication message carries identification information of start of measurement iteration, indication information that the second MEP needs to send the data packets, and configuration parameters used by the second MEP to send the data packets. The first MEP receives a measurement iteration start reply message from the second MEP.

Preferably, the configuration parameters can comprise the transmission rate used by the second MEP to send the data packets in this transmission, transmission duration, size of data packet, priority of data packet and pattern of data packet.

When performing the measurement of two-way throughput, except for indicating start of the measurement iteration, the measurement iteration start indication message that the first MEP sends to the second MEP also indicates the configuration information used by the second MEP to send the data packets. Through the above processing, the subsequent measurement of two-way throughput can be performed effectively, and the operation process can be simplified.

Preferably, for the measurement of two-way throughput, when completing the transmission of the data packets in this transmission, the first MEP needs to send a measurement iteration end indication message to the second MEP, wherein the measurement iteration end indication message indicates end of sending the data packets by the first MEP in this transmission. After the second MEP receives the measurement iteration end indication message and determines the sending of the data packets by the second MEP itself in this transmission is ended, the first MEP receives a measurement iteration end reply message, also called a count message, from the second MEP, wherein the measurement iteration end reply message carries the number of data packets transmitted by the second MEP.

The local MEP sends the measurement iteration end indication message to the opposite MEP to indicate the end of sending the data packets by the local MEP in this transmission. Then, the opposite MEP can measure the number of received data packets effectively and feed it back. Thereby, a foundation can be provided for subsequent calculation of packet loss, and the operation process of measurement can be simplified.

Preferably, step S306 can further comprise the following processing: the first MEP judges whether the packet loss P1 in the forward direction and the packet loss P2 in the reverse direction are 0 at the same time, wherein the forward direction is the one in which the first MEP transmits the data packets to the second MEP, and the reverse direction is the one in which the second MEP transmits the data packets to the first MEP.

Packet loss in either way of the two-way transmission of the data packets can be accurately calculated through the above calculating processing. Judging whether packet loss occurs according to calculation result and judging whether the transmission rate meets the requirement of target precision can determine whether it is necessary to perform the next measurement iteration of throughput measurement. Also, the algorithm is simple and easy to implement.

Preferably, if the first MEP determines that packet loss occurs in this transmission of the data packets or the transmission rate does not meet the requirement of target precision, the first MEP adopts the binary search algorithm to change the transmission rate for transmitting the data packets iteration by iteration, and carries a new transmission rate for the reverse direction in the measurement iteration start indication message while sending to the second MEP. The above process is repeated until packet loss does not occur in either way of the two-way transmission of the data packets and the transmission rate meets the requirement of target precision in either way.

When performing the two-way transmission of the data packets, if packet loss occurs or the transmission rate does not meet the requirement of target precision, the throughput in transmission direction cannot be determined. It is needed to perform the next measurement iteration of throughput measurement, so that the transmission rate needs to be changed to transmit the data packets. This process is repeated, until packet loss does not occur and the transmission rate meets the requirement of target precision. Then it can be determined that the transmission rate is the throughput in transmission direction. Through the above processing, the throughput in transmission direction can be determined, and the determined throughput can meet a certain precision requirement.

In the above, adopting the binary search algorithm can quickly obtain the transmission rate for transmitting the data packets in the next transmission and simplify the operation process.

The above process is described below with reference to FIG. 4.

Figure 4:
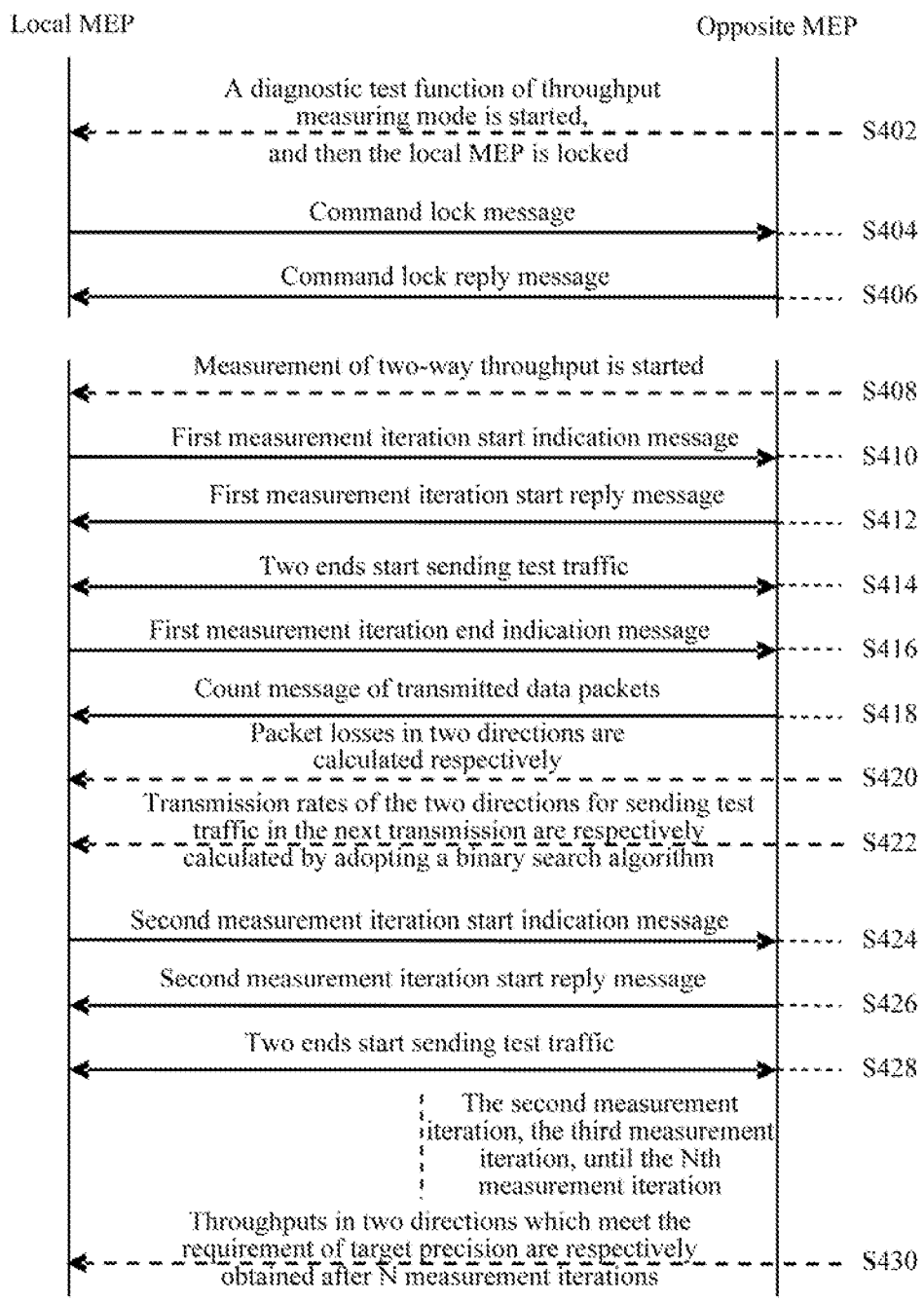
FIG. 4 shows a flowchart of a method for measuring throughput according to the preferred embodiment 1 of the disclosure.

FIG. 4 shows a flowchart of a method for measuring throughput according to the preferred embodiment 1 of the disclosure. The preferred embodiment 1 mainly describes the process of the measurement of two-way throughput in the MPLS-TP network. As shown in FIG. 4, the method for measuring two-way throughput comprises the following steps.

Step S402: a diagnostic test function of throughput measuring mode is started at the local MEP in the MPLS-TP network. Then the MEP is locked. That is to say, the MEP will prevent all service traffics from passing.

Step S404: except for being locked, the local MEP also sends a command lock message to the opposite MEP to lock the opposite MEP.

Step S406: after receiving the command lock message, the opposite MEP is also locked and returns a command lock reply message indicating the reception of the command and the success of locking.

Step S408: the measurement of two-way throughput is started at the local MEP. Before starting, it is needed to configure initial transmission rates of test traffic, transmission duration, size of data packet, priority of data packet and pattern of data packet, and specify target precision of measurement.

Step S410: the local MEP sends a first measurement iteration start indication message to the opposite MEP as a start delimiter (namely the identification information of start of test) of the first measurement iteration, and carries in the message the initial transmission rate of test traffic, transmission duration, size of data packet, priority of data packet and pattern of data packet which are configured at the local MEP for the opposite MEP, to require the opposite MEP to transmit test traffic based on these measurement parameters.

Step S412: after receiving the first measurement iteration start indication message, the opposite MEP will return a first measurement iteration start reply message to the local MEP.

Step S414: the local MEP starts sending test traffic based on the measurement parameters configured before, and ends sending after reaching transmission duration. The opposite MEP starts sending test traffic based on the measurement parameters carried in the received first measurement iteration start indication message, and ends sending after reaching transmission duration.

Step S416: after ending the transmission of test traffic, the local MEP sends a first measurement iteration end indication message to the opposite MEP as an end delimiter of the first measurement iteration.

Step S418: after receiving the first measurement iteration end indication message and ending the transmission of test traffic, the opposite MEP sends a count message to the local MEP, wherein the count message carries the number of the data packets transmitted by the opposite MEP in the period of the first measurement iteration.

Step S420: after receiving the count message, the local MEP calculates packet loss of test traffic in two directions respectively, and the calculation result will determine whether to execute the subsequent steps.

In the above, if both the packet loss in the forward direction and the packet loss in the reverse direction are 0, the measurement of the two-way throughput is ended. That is, the subsequent step is not executed any more, and the initial transmission rates are the measured throughput in the forward direction as well as the measured throughput in the reverse direction.

In the above, if either the packet loss in the forward direction or the packet loss in the reverse direction is not 0, the measurement of two-way throughput is continued. That is, the flow continues to execute step S422.

Step S422: the local MEP adopts the binary search algorithm to calculate the transmission rates of sending test traffic in the two directions respectively in the next transmission, to replace the initial transmission rates in the measurement parameters.

In specific implementation process, the local MEP can also adopt other algorithms to calculate the transmission rates of sending test traffic in the two directions respectively in the next transmission;

Step S424: the local MEP sends a second measurement iteration start indication message to the opposite MEP, wherein the content and effect of the indication message are basically the same as that of the first measurement iteration start indication message in step S410, and the only difference is that the initial transmission rate is replaced with the transmission rate for the reverse direction calculated by adopting the binary search algorithm.

Step S426: after receiving the second measurement iteration start indication message, the opposite MEP will return a second measurement iteration start reply message to the local MEP.

Step S428: two ends start sending test traffic. The measurement parameters used are basically the same as that of the first measurement iteration, and the only difference is that the initial transmission rates is not used as the sending rates any more, but the transmission rates that are respectively calculated in two directions using the binary search algorithm are used.

After executing step S428, the signalling and calculation process of the second measurement iteration are consistent with that of the first measurement iteration. After the second measurement iteration is completed, if both the packet loss in the forward direction and the packet loss in the reverse direction are 0, and transmission rates in two directions meet the requirement of target precision, the measurement of two-way throughput is ended. The transmission rates of test traffic in two directions that are used in the measurement iteration are the measured throughputs. If either the packet loss in the forward direction or the packet loss in the reverse direction is not 0, the flow continues to execute the third measurement iteration and so on, until both the packet loss in the forward direction and the packet loss in the reverse direction are 0 and the transmission rates in two directions meet the requirement of target precision.

Step S430: after N measurement iterations, the two-way throughputs which meet the requirement of specified target precision can be obtained respectively, wherein N represents variable number of times, and its value is related to setting of initial transmission rates, selection of search algorithm and target precision.

In the above, the starting time of step S408 is independent of step S402 to step S406. In step S414, two ends can transmit test traffic either synchronously or asynchronously.

Preferably, the first MEP can also perform the transmission of the data packets with the second MEP in the one-way transmission mode. Performing the transmission of the data packets in the one-way transmission mode is to perform a measurement of the one-way throughput. The process of measurement of one-way throughput is described below.

Preferably, before executing step S302, for the measurement of one-way throughput, the first MEP sends a measurement iteration start indication message to the second MEP, wherein the measurement iteration start indication message carries identification information of start of measurement iteration. The first MEP receives a measurement iteration start reply message from the second MEP.

When performing the measurement of one-way throughput, the first MEP sends the measurement iteration start indication message to the second MEP to indicate start of the measurement iteration. Through the above processing, the subsequent measurement of one-way throughput can be performed effectively, and the operation process can be simplified.

Preferably, for the measurement of one-way throughput, when the first MEP completes the transmission of the data packets in this transmission, the second MEP receives a measurement iteration end indication message from the first MEP, wherein the measurement iteration end indication message indicates end of sending the data packets by the first MEP in this transmission. The first MEP receives a measurement iteration end reply message, also called a count message, from the second MEP, wherein the measurement iteration end reply message carries the number of data packets received by the second MEP.

The local MEP sends the measurement iteration end indication message to the opposite MEP to indicate the end of sending the data packets by the local MEP in this transmission. Then, the opposite MEP can measure the number of received data packets effectively and feed it back. Thereby a foundation can be provided for subsequent calculation of packet loss, and the operation process of measurement can be simplified.

Preferably, the first MEP judging whether packet loss occurs in this transmission of the data packets according to the measurement information comprises that the first MEP judges whether the packet loss P1 in the forward direction is 0, wherein the forward direction is the one in which the first MEP transmits the data packets to the second MEP.

Packet loss in the one-way transmission of the data packets can be accurately calculated through the above calculating processing. Judging whether packet loss occurs according to the calculation result and judging whether the transmission rate meets the requirement of target precision can determine whether it is necessary to perform the next measurement iteration of throughput measurement. Also, the algorithm is simple and easy to implement.

Preferably, if the first MEP determines that packet loss occurs in this transmission of the data packets or the transmission rate does not meet the requirement of target precision, the first MEP adopts the binary search algorithm to change the transmission rate for transmitting the data packets iteration by iteration. The above process is repeated until packet loss does not occur in the transmission of the data packets and the transmission rate meets the requirement of target precision.

Through the above processing, the throughput in the transmission direction can be determined, and the determined throughput can meet a certain precision requirement.

In the above, adopting the binary search algorithm can quickly obtain the transmission rate for transmitting the data packets in the next transmission and simplify the operation process.

The above process is described below with reference to FIG. 5.

Figure 5:
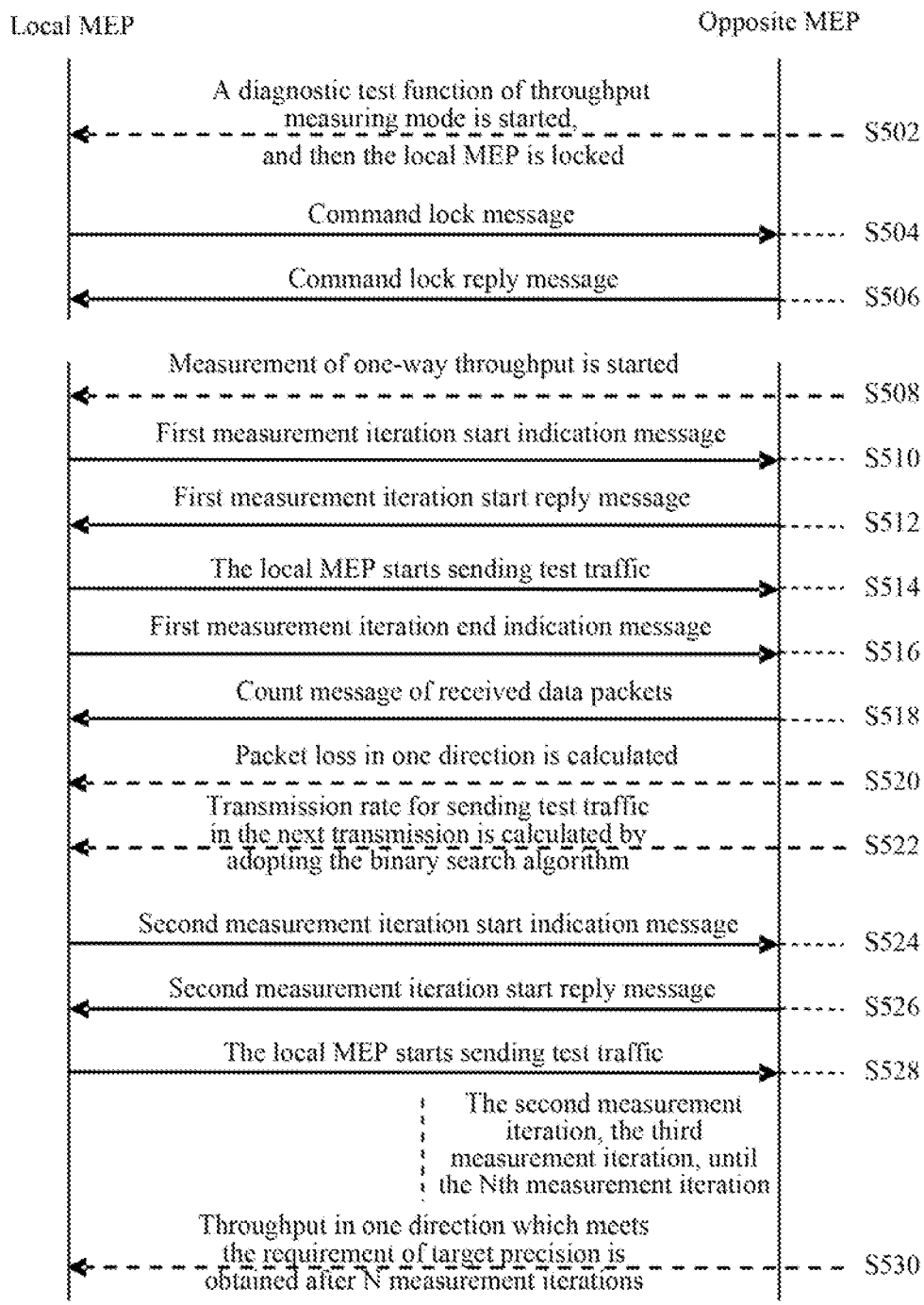
FIG. 5 shows a flowchart of a method for measuring throughput according to the preferred embodiment 2 of the disclosure.

FIG. 5 shows a flowchart of a method for measuring throughput according to the preferred embodiment 2 of the disclosure. The preferred embodiment 2 mainly describes the process of measurement of one-way throughput in the MPLS-TP network. As shown in FIG. 5, the method for measuring one-way throughput comprises the following steps.

Step S502: a diagnostic test function of throughput measuring mode is started at the local MEP in the MPLS-TP network. Then, the MEP is locked. That is to say, the MEP will prevent all service traffics from passing.

Step S504: except for being locked, the local MEP also sends a command lock message to the opposite MEP to lock the opposite MEP.

Step S506: after receiving the command lock message, the opposite MEP is also locked and returns a command lock reply message indicating the reception of the command and the success of locking.

Step S508: the measurement of one-way throughput is started at the local MEP. Before starting, it is needed to configure initial transmission rate of test traffic, transmission duration, size of data packet, priority of data packet and pattern of data packet, and specify target precision of measurement.

Step S510 to step S518: the local MEP sends a first measurement iteration start indication message to the opposite MEP as a start delimiter of the first measurement iteration. After receiving the first measurement iteration start indication message, the opposite MEP will return a first measurement iteration start reply message to the local MEP. The local MEP starts sending test traffic based on the measurement parameters configured before, and ends sending after reaching transmission duration. After ending transmission of test traffic, the local MEP sends a first measurement iteration end indication message to the opposite MEP as an end delimiter of the first measurement iteration. After receiving the first measurement iteration end indication message and ending the transmission of test traffic, the opposite MEP sends a count message to the local MEP, wherein the count message carries the number of data packets received by the opposite MEP in the period of the first measurement iteration.

Step S520: after receiving the count message, the local MEP calculates packet loss of test traffic in one direction (namely the direction that the local MEP is towards the opposite MEP). The calculation result will determine whether to execute the subsequent steps.

In the above, if packet loss of test traffic is 0, the measurement of one-way throughput is ended. That is, the subsequent steps are not executed any more, and the initial transmission rate is the measured one-way throughput.

In the above, if packet loss of test traffic is not 0, the measurement of one-way throughput is continued. That is, the flow continues on the execution of the subsequent steps.

Step S522: the local MEP adopts the binary search algorithm to calculate the transmission rate used by the local MEP to transmit test traffic in the next transmission to replace the initial transmission rate in the measurement parameters.

In specific implementation process, the local MEP can also adopt other algorithms to calculate the transmission rate for sending test traffic in the next transmission of the direction.

Step S524: the local MEP sends a second measurement iteration start indication message to the opposite MEP as a start delimiter of the second measurement iteration.

Step S526: after receiving the second measurement iteration start indication message, the opposite MEP will return a second measurement iteration start reply message to the local MEP.

Step S528: the local MEP starts sending test traffic. The measurement parameters used are basically the same as that of the first measurement iteration, and the only difference is that the initial transmission rate is not used as the sending rate any more, but the transmission rate that is calculated using the binary search algorithm is used.

After executing step S528, signalling and calculation process of the second measurement iteration are consistent with that of the first measurement iteration. After the second measurement iteration is completed, if packet loss of test traffic is 0, and the transmission rate meets the requirement of target precision, the measurement of one-way throughput is ended. The transmission rate of test traffic that is used in the measurement iteration is the measured throughput. If packet loss of test traffic is not 0, execution of the third measurement iteration is continued and so on, until packet loss of test traffic is 0 and the transmission rate meets the requirement of target precision.

Step S530: after N measurement iterations, the one-way throughput which meets the requirement of the specified target precision can be obtained, wherein N represents variable number of times, and its value is related to setting of initial transmission rate, selection of search algorithm and target precision.

In the above, the starting time of step S508 is independent of step S502 to step S506.

Figure 6:
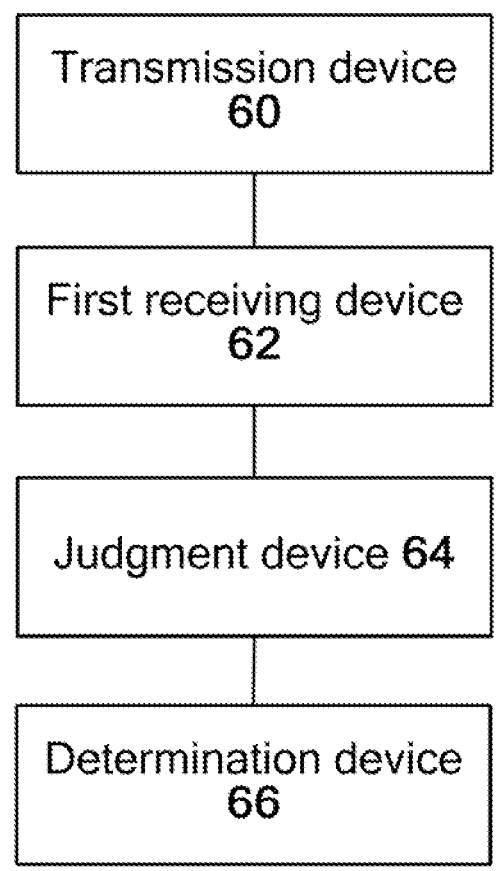
FIG. 6 shows a structure diagram of a MEP according to the embodiment of the disclosure.

FIG. 6 shows a structure diagram of a MEP according to the embodiment of the disclosure. The MEP comprises: a transmission device 60, a first receiving device 62, a judgment device 64 and a determination device 66.

The transmission device 60 is configured to perform the transmission of the data packets with another MEP in the MPLS-TP network in a preset time period.

The first receiving device 62 is configured to, after the preset time period, receive measurement information fed back by the another MEP, wherein the measurement information indicates the number of data packets transmitted by the another MEP in this transmission.

The judgment device 64 is configured to judge whether packet loss occurs in this transmission of the data packets according to the measurement information, and if not, judge whether the transmission rate meets the requirement of target precision.

The determination device 66 is configured to obtain the throughput of the transmission of the data packets in the transmission direction based on that the judgment device judges that packet loss does not occur in this transmission of the data packets and the transmission rate meets the requirement of target precision.

In embodiments of the disclosure, it is required to upgrade hardware of communication device itself (e.g., adding a data packet flow generator), but the measuring instrument is not needed. Measurement of two-way throughput or one-way throughput can be started and completed just at one end (namely the MEP) of the measured link, which saves manpower, material resources and time. Hence, cost can be reduced and operation and maintenance can be simplified.

Figure 7:
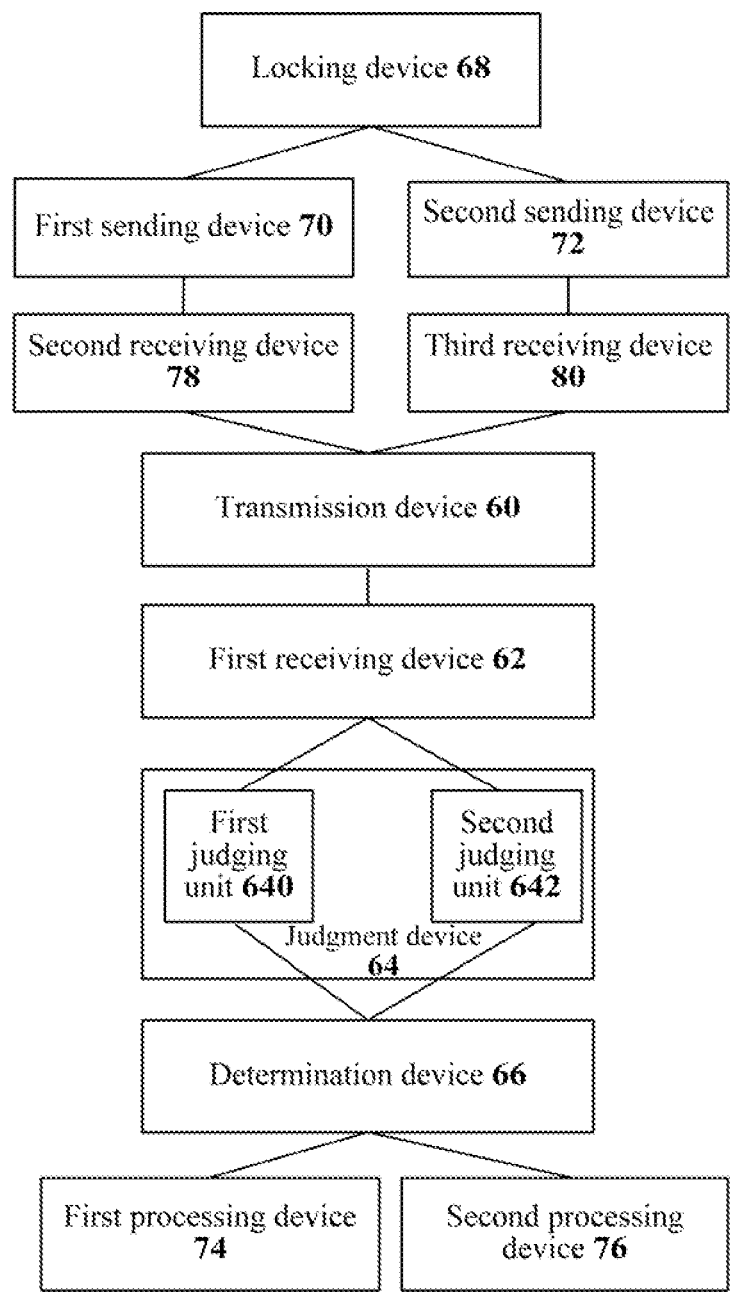
FIG. 7 shows a structure diagram of a MEP according to the preferred embodiment of the disclosure.

Preferably, as shown in FIG. 7, the MEP can further comprise: a locking device 68, configured to lock the MEP and the another MEP.

When performing the transmission of the data packets in the two-way transmission mode, the locking device 68 is connected with the transmission device 60. Locking the MEPs at two ends of transmission direction can further comprise the following processing: a MEP starts a diagnostic test function of throughput measuring mode, and locks the MEP; and the MEP sends a command to another MEP to lock the another MEP.

Through the locking function of the locking device 68, before test, passing of service traffic that a MEP transmits to another MEP is prevented. Thereby, the accuracy of the test can be improved effectively.

Preferably, as shown in FIG. 7, the MEP can further comprise: a first sending device 70, configured to, when performing the transmission of the data packets in the two-way transmission mode, send the first measurement iteration start indication message to the another MEP, wherein the measurement iteration start indication message carries identification information of start of measurement iteration, indication information of sending the data packets by the another MEP, and configuration parameters used by the another MEP to send the data packets; a second receiving device 78, configured to, when performing the transmission of the data packets in the two-way transmission mode, receive the first measurement iteration start reply message from the another MEP; a second sending device 72, configured to, when performing the transmission of the data packets in the one-way transmission mode, send the second measurement iteration start indication message to the another MEP, wherein the measurement iteration start indication message carries identification information of start of measurement iteration; and the third receiving device 80, configured to, when performing the transmission of the data packets in the one-way transmission mode, receive the second measurement iteration start reply message from the another MEP.

Both the measurement of two-way throughput and the measurement of one-way throughput can be started on the local MEP. As described above, before starting, it is needed to configure the measurement parameters of test traffic, and specify the target precision of measurement.

If it is the measurement of two-way throughput, except for serving as the start delimiter of the measurement iteration (namely identification information of start of measurement iteration), the measurement iteration start indication message that the local MEP sends to the opposite MEP also needs to carry a command (namely indication information of sending the data packets by the another MEP) that requires the opposite MEP to transmit test traffic and the measurement parameters provided for the opposite MEP. These are the configuration parameters (namely the configuration parameters used by the another MEP to send the data packets) when the opposite MEP transmits test traffic.

If it is the measurement of one-way throughput, the measurement iteration start indication message that the local MEP sends to the opposite MEP only serves as the start delimiter of the measurement iteration (namely identification information of start of measurement iteration). It can be that the measurement iteration start indication message does not carry other content.

Preferably, the first sending device 70 and the second sending device 72 are further configured to send the measurement iteration end indication message to the another MEP, wherein the measurement iteration end indication message indicates end of sending the data packets by the MEP (namely the local MEP) in this transmission.

The first sending device 70 and the second sending device 72 send the measurement iteration end indication message to the another MEP (namely the opposite MEP) to indicate end of the measurement iteration. Then, the opposite MEP can measure the number of received data packets effectively and feed it back. Thereby, a foundation can be provided for subsequent calculation of packet loss, and the operation process of measurement can be simplified.

Preferably, as shown in FIG. 7, the judgment device 64 comprises: a first judging unit 640, configured to, when performing the transmission of the data packets in the two-way transmission mode, judge whether the packet loss P1 in the forward direction and the packet loss P2 in the reverse direction are 0; and a second judging unit 642, configured to, when performing the transmission of the data packets in the one-way transmission mode, judge whether the packet loss P1 in the forward direction is 0; wherein, the forward direction is the one in which the MEP sends data packet to the another MEP, and the reverse direction is the one in which the another MEP sends data packet to the MEP.

If it is the measurement of two-way throughput, the opposite MEP will send a count message after ending transmission of test traffic and receiving the measurement iteration end indication message, wherein the count message comprises both the number of data packets sent and the number of data packets received by the opposite MEP in the period of single measurement iteration. If the number of data packets sent and the number of data packets received by the local MEP in the period of single measurement iteration are TX1 and RX1 respectively, and the number of data packets sent and the number of data packets received in the count message received by the local MEP are TX2 and RC2 respectively, then the packet losses in two directions are respectively calculated as follows:

packet loss in the forward direction $PLR_{forward}$ (namely P1)=(TX1−RX2)/TX1;

packet loss in the reverse direction $PLR_{reverse}$ (namely P2)=(TX2−RX1)/TX2.

If it is the measurement of one-way throughput, the opposite MEP will send a count message after receiving the measurement iteration end indication message, wherein the count message only comprises the number of data packets received by the opposite MEP in the period of single measurement iteration. If the number of data packets sent by the local MEP in the period of single measurement iteration is TX, and the number of received data packets in the count message received by the local MEP is RX, then packet loss in one direction is calculated as follows:

packet loss PLR (namely P1)=(TX−RX)/TX.

Packet loss in the two-way or the one-way transmission of the data packets can be accurately calculated through the above calculating processing. Judging whether packet loss occurs according to calculation result and judging whether the transmission rate meets the requirement of target precision can determine whether it is necessary to perform the next measurement iteration of throughput measurement. Also, the algorithm is simple and easy to implement.

Preferably, as shown in FIG. 7, the MEP can further comprise: a first processing device 74, configured to, when performing the transmission of the data packets in the two-way transmission mode, if packet loss occurs in the transmission or the transmission rate does not meet the requirement of target precision, adopt the binary search algorithm to change the transmission rate for transmitting the data packets iteration by iteration, and carry a new transmission rate of the reverse direction in the measurement iteration start indication message while sending to the another MEP, until packet loss does not occur in two-way transmission of data packet and transmission rates in both directions meet requirement of target precision; and a second processing device 76, configured to, when performing the transmission of the data packets in the one-way transmission mode, if packet loss occurs in the transmission or the transmission rate does not meet the requirement of target precision, adopt the binary search algorithm to change the transmission rate for transmitting the data packets iteration by iteration, until packet loss does not occur in one-way transmission of data packet and the transmission rate meets the requirement of target precision.

In specific implementation process, when the first processing device 74 changes the transmission rate for transmitting the data packets, it is not limited to use the binary search algorithm to calculate the transmission rate for transmitting the data packets in the next transmission. Other algorithms can also be adopted to calculate the transmission rate for transmitting the data packets in the next transmission.

In specific implementation process, it may take a certain number of iterations of measurement to finally obtain the throughput which meets the requirement of the specified target precision. The number of iterations of measurement is a variable number, and is related to setting of initial transmission rate, selection of search algorithm and target precision.

Adopting the binary search algorithm can obtain the transmission rate for transmitting the data packets in the next transmission quickly, improve the measurement efficiency and simplify the operation process.

In conclusion, the above embodiments provided by the disclosure provide the technical solution for measuring throughput (comprising the measurement of two-way throughput and the measurement of one-way throughput) in the MPLS-TP network based on the OAM functional entity. This solution overcomes the problems in the current technical solution that the measuring instrument must be used and the measurement must be simultaneously performed at two ends of the measured link. This solution does not need measuring instrument, and can start and complete the measurement of two-way throughput or one-way throughput just at one end of the measured link. Thereby, measurement cost of throughput is greatly reduced, and operation and maintenance are simplified.

Obviously, the those skilled in the field should appreciate that the above-mentioned modules and steps of the disclosure can be realized by a general-purpose computing device, and they can be centralized in a single computing device or distributed on a network composed of multiple computing devices; optionally, they can be realized by program code which is capable of being executed by the computing device, so that they can be stored in a storage device and executed by the computing device. In addition, under some conditions, the presented or described steps can be executed in an order different from that described here; or they are made into integrated circuit modules, respectively; or multiple modules and steps of them are made into a single integrated circuit module to realize. In this way, the disclosure is not limited to any particular combination of hardware and software.

The above is only the preferred embodiments of the disclosure and is not intended to limit the disclosure. For those skilled in the field, the disclosure may have various modifications and changes. Any modifications, equivalent replacements, improvements and the like within the spirit and principle of the disclosure shall fall within the scope of the claims of the disclosure.

What is claimed is:

1. A method for measuring throughput, applied in a Multi-Protocol Label Switching-Transport Profile (MPLS-TP) network, comprising:
   a first Maintenance End Point (MEP) in the MPLS-TP network performing two-way or one-way transmission of data packets with a second MEP in the MPLS-TP network in a preset time period;
   after the preset time period, the first MEP receiving measurement information fed back by the second MEP, wherein the measurement information indicates the number of the data packets transmitted by the second MEP in this transmission; and
   according to the measurement information, the first MEP determining that packet loss does not occur in this transmission of the data packets and a transmission rate meets a requirement of target precision, and then obtaining the throughput of the transmission of the data packets in a transmission direction;
   when performing the transmission of the data packets in a two-way transmission mode, before the first MEP performs the transmission of the data packets with the second MEP, the method further comprises:
   sending, by the first MEP, a measurement iteration start indication message to the second MEP, wherein the measurement iteration start indication message carries identification information of start of measurement iteration, indication information of transmitting the data packets by the second MEP, and configuration parameters used by the second MEP to transmit the data packets; and receiving, by the first MEP, a measurement iteration start reply message from the second MEP;
   or,
   when performing the transmission of the data packets in a one-way transmission mode, the method further comprises:
   sending, by the first MEP, a measurement iteration start indication message to the second MEP, wherein the measurement iteration start indication message carries identification information of start of measurement iteration; and receiving, by the first MEP, a measurement iteration start reply message from the second MEP.

2. The method according to claim 1, wherein before the first MEP performs the two-way or one-way transmission of the data packets with the second MEP, the method further comprises: locking the first MEP and the second MEP; and
   locking the first MEP and the second MEP comprises:
   starting, by the first MEP, a diagnostic test function of a throughput measuring mode, and locking the first MEP; and sending, by the first MEP, a command to the second MEP to lock the second MEP.

3. The method according to claim 1, wherein when performing the transmission of the data packets in the two-way transmission mode,
   the configuration parameters comprise: a transmission rate used by the second MEP to transmit the data packets in this transmission, a transmission duration, a size of the data packet, a priority of the data packet and a pattern of the data packet.

4. The method according to claim 3, further comprising: if the first MEP determines that the packet loss occurs in this transmission of the data packets or the transmission rate does not meet the requirement of target precision, the first MEP adopting a binary search algorithm to change the transmission rate for transmitting the data packets iteration by iteration, and carrying a new transmission rate of a reverse direction in the measurement iteration start indication message while sending to the second MEP, until the packet loss does not occur in either way of the two-way transmission of the data packets and the transmission rate meets the requirement of target precision.

5. The method according to claim 1, when performing the transmission of the data packets in the two-way transmission mode, further comprising:
   sending, by the first MEP, a measurement iteration end indication message to the second MEP, wherein the measurement iteration end indication message indicates end of transmitting the data packets by the first MEP in this transmission; and
   receiving, by the first MEP, a measurement iteration end reply message, that is a count message, from the second MEP, wherein the measurement iteration end reply message carries the number of the data packets transmitted by the second MEP.

6. The method according to claim 5, further comprising: if the first MEP determines that the packet loss occurs in this transmission of the data packets or the transmission rate does not meet the requirement of target precision, the first MEP adopting a binary search algorithm to change the transmission rate for transmitting the data packets iteration by iteration, and carrying a new transmission rate of a reverse direction in the measurement iteration start indication message while sending to the second MEP, until the packet loss does not occur in either way of the two-way transmission of the data packets and the transmission rate meets the requirement of target precision.

7. The method according to claim 1, when performing the transmission of the data packets in the two-way transmission mode, further comprising: if the first MEP determines that the packet loss occurs in this transmission of the data packets or the transmission rate does not meet the requirement of target precision, the first MEP adopting a binary search algorithm to change the transmission rate for transmitting the data packets iteration by iteration, and carrying a new transmission rate of a reverse direction in the measurement iteration start indication message while sending to the second MEP, until the packet loss does not occur in either way of the two-way transmission of the data packets and the transmission rate meets the requirement of target precision.

8. The method according to claim 1, when performing the transmission of the data packets in the one-way transmission mode, further comprising:
   sending, by the first MEP, a measurement iteration end indication message to the second MEP, wherein the measurement iteration end indication message indicates end of sending the data packets by the first MEP in this transmission; and
   receiving, by the first MEP, a measurement iteration end reply message, that is a count message, from the second MEP, wherein the measurement iteration end reply message carries the number of the data packets received by the second MEP.

9. A Maintenance End Point (MEP), applied in a Multi-Protocol Label Switching-Transport Profile (MPLS-TP) network, comprising:
   a transmission device, configured to perform two-way or one-way transmission of data packets with another MEP in the MPLS-TP network in a preset time period;
   a first receiving device, configured to, after the preset time period, receive measurement information fed back by the another MEP, wherein the measurement information indicates the number of the data packets transmitted by the another MEP in this transmission;

a judgment device, configured to judge whether packet loss occurs in this transmission of the data packets according to the measurement information, and if not, judge whether a transmission rate meets a requirement of target precision; and a determination device, configured to obtain a throughput of the transmission of the data packets in a transmission direction based on that the judgment device judges that packet loss does not occur in this transmission of the data packets and the transmission rate meets the requirement of target precision;

a first sending device, configured to, when performing the transmission of the data packets in a two-way transmission mode, send a first measurement iteration start indication message to the another MEP, wherein the first measurement iteration start indication message carries identification information of start of measurement iteration, indication information of sending the data packets by the another MEP, and configuration parameters used by the another MEP to send the data packets; a second receiving device, configured to, when performing the transmission of the data packets in the two-way transmission mode, receive a first measurement iteration start reply message from the another MEP; a second sending device, configured to, when performing the transmission of the data packets in a one-way transmission mode, send a second measurement iteration start indication message to the another MEP, wherein the second measurement iteration start indication message carries the identification information of start of measurement iteration; and a third receiving device, configured to, when performing the transmission of the data packets in the one-way transmission mode, receive a second measurement iteration start reply message from the another MEP.

10. The MEP according to claim 9, further comprising:
a locking device, configured to lock the MEP and the another MEP.

11. The MEP according to claim 9, wherein
the first sending device and the second sending device are further configured to send a measurement iteration end indication message to the another MEP, wherein the measurement iteration end indication message indicates end of sending the data packets by the MEP in this transmission.

12. The MEP according to claim 10, wherein the judgment device comprises:
a first judging unit, configured to, when performing the transmission of the data packets in the two-way transmission mode, judge whether a packet loss P1 in a forward direction and a packet loss P2 in a reverse direction are 0 at the same time; and
a second judging unit, configured to, when performing the transmission of the data packets in the one-way transmission mode, judge whether the packet loss P1 in the forward direction is 0;
wherein the forward direction is a direction in which the MEP sends the data packets to the another MEP, and the reverse direction is a direction in which the another MEP sends the data packets to the MEP.

13. The MEP according to claim 10, further comprising:
a first processing device, configured to, when performing the transmission of the data packets in the two-way transmission mode, if the packet loss occurs in the transmission or the transmission rate does not meet the requirement of target precision, adopt a binary search algorithm to change the transmission rate for transmitting the data packets iteration by iteration, and carrying a new transmission rate of a reverse direction in the measurement iteration start indication message while sending to the another MEP, until the packet loss does not occur in either way of the two-way transmission of the data packets and the transmission rate meets the requirement of target precision; and
a second processing device, configured to, when performing the transmission of the data packets in the one-way transmission mode, if the packet loss occurs in the transmission or the transmission rate does not meet the requirement of target precision, adopt the binary search algorithm to change the transmission rate for transmitting the data packets iteration by iteration, until the packet loss does not occur in the one-way transmission of the data packets and the transmission rate meets the requirement of target precision.

14. The MEP according to claim 9, wherein the judgment device comprises:
a first judging unit, configured to, when performing the transmission of the data packets in the two-way transmission mode, judge whether a packet loss P1 in a forward direction and a packet loss P2 in a reverse direction are 0 at the same time; and
a second judging unit, configured to, when performing the transmission of the data packets in the one-way transmission mode, judge whether the packet loss P1 in the forward direction is 0;
wherein the forward direction is a direction in which the MEP sends the data packets to the another MEP, and the reverse direction is a direction in which the another MEP sends the data packets to the MEP.

15. The MEP according to claim 9, further comprising:
a first processing device, configured to, when performing the transmission of the data packets in the two-way transmission mode, if the packet loss occurs in the transmission or the transmission rate does not meet the requirement of target precision, adopt a binary search algorithm to change the transmission rate for transmitting the data packets iteration by iteration, and carrying a new transmission rate of a reverse direction in the measurement iteration start indication message while sending to the another MEP, until the packet loss does not occur in either way of the two-way transmission of the data packets and the transmission rate meets the requirement of target precision; and
a second processing device, configured to, when performing the transmission of the data packets in the one-way transmission mode, if the packet loss occurs in the transmission or the transmission rate does not meet the requirement of target precision, adopt the binary search algorithm to change the transmission rate for transmitting the data packets iteration by iteration, until the packet loss does not occur in the one-way transmission of the data packets and the transmission rate meets the requirement of target precision.

* * * * *